United States Patent [19]
Buikema

[11] Patent Number: 4,777,576
[45] Date of Patent: Oct. 11, 1988

[54] ENERGY CONVERTER WITH SERIES RESONANT BRIDGE AND SWITCHING CIRCUIT

[75] Inventor: Wolter Buikema, Borne, Netherlands

[73] Assignee: Hollandse Signaalapparaten B.V., Hengelo, Netherlands

[21] Appl. No.: 67,657

[22] Filed: Jun. 29, 1987

[30] Foreign Application Priority Data

Jul. 10, 1986 [NL] Netherlands .................. 8601798

[51] Int. Cl.$^4$ .............................. H02M 3/315
[52] U.S. Cl. ........................... 363/28; 363/58; 363/124
[58] Field of Search ............... 363/27, 28, 57–58, 363/96, 124, 135, 136

[56] References Cited

U.S. PATENT DOCUMENTS

| | | | |
|---|---|---|---|
| 4,220,989 | 9/1980 | Perilstein | 363/124 X |
| 4,410,926 | 10/1983 | Hafner et al. | 363/58 X |
| 4,488,213 | 12/1984 | Buikema | 363/28 X |
| 4,495,555 | 1/1985 | Eikelboom | 363/28 |
| 4,652,985 | 3/1987 | Bougle | 363/124 X |

Primary Examiner—Peter S. Wong
Attorney, Agent, or Firm—Thomas A. Briody; David R. Treacy; Bernard Franzblau

[57] ABSTRACT

An energy converter of the type utilizing a series-resonant bridge circuit (1) containing at least two thyristors (6A, 7A, 6B, 7B) with diodes (8A, 9A, 8B, 9B) antiparallel connected thereto, a high-frequency output transformer (12), and an energy buffer (2). A control circuit (3) is incorporated for generating trigger pulses for the appropriate thyristors in response to the energy of the buffer (2). The energy converter further comprises a switching circuit (24) connected in at least one of the supply lines of the supply source to the series-resonant circuit for ensuring that the diode, antiparallel connected to the last-conducting thyristor, starts to draw current immediately after this thyristor is blocked. The control circuit (3) furthermore generates signals indicative of the presence of current flowing through the diodes, which signals control the supply of the trigger pulses to the thyristors.

9 Claims, 3 Drawing Sheets

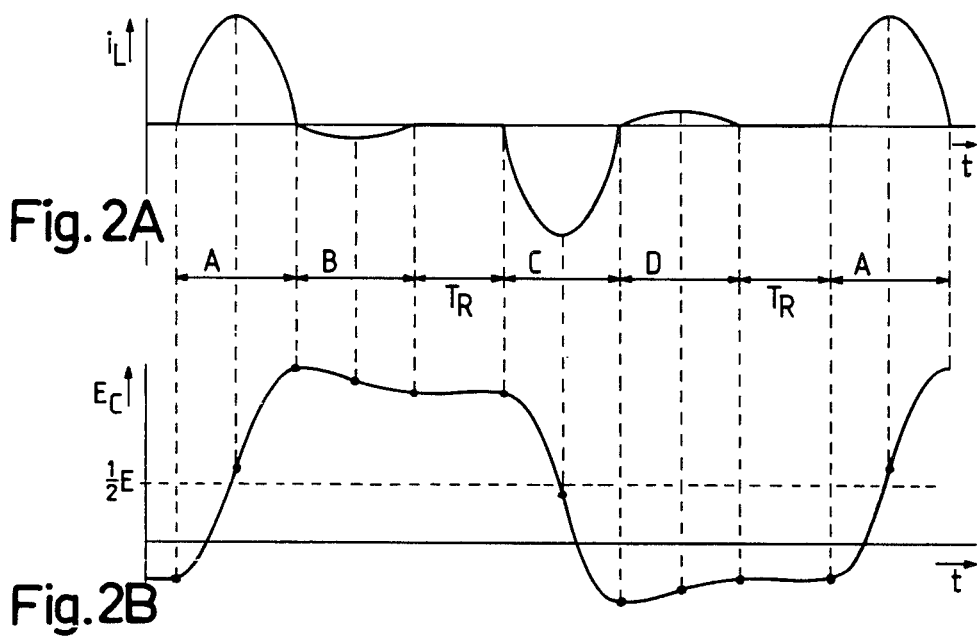
Fig.2A
Fig.2B
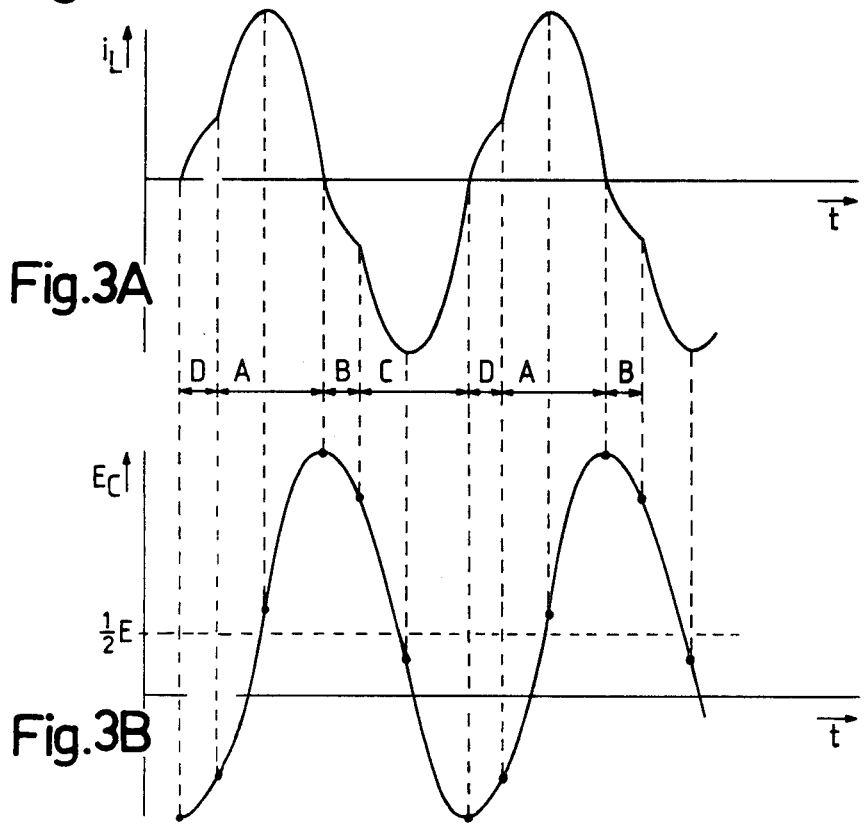
Fig.3A
Fig.3B

ENERGY CONVERTER WITH SERIES RESONANT BRIDGE AND SWITCHING CIRCUIT

BACKGROUND OF THE INVENTION

This invention relates to an energy converter, whereby a load is supplied with energy from a source, utilising a series-resonant bridge circuit containing at least two thyristors with diodes connected antiparallel thereto and a high-frequency output transformer, and an energy buffer. Furthermore, a control circuit is present for generating trigger pulses in response to the energy supplied to and extracted from the buffer to bring the appropriate thyristors into the conducting state, which control circuit includes diode current detectors for supplying signals indicative of the presence of current flowing through said diodes. Switching means are provided for passing the trigger pulses to the thyristors in the bridge circuit, conditional upon the presence of current flowing through the respective diodes antiparallel connected to the thyristors conducting last and directly before said diodes.

Such energy converters have been known for a long time and their purpose is to convert the energy from a single phase or a polyphase AC source or from a DC source into energy with a single phase or polyphase AC voltage of a different amplitude and/or frequency, or into a pulsating voltage or with a DC voltage. With the relevant thyristors of the bridge circuit in the conducting state, energy from the source is supplied to an energy buffer via the series resonant circuit, and energy is extracted from the buffer by the load. During the time when the thyristors are in the conducting state the energy supplied to the buffer may be returned to the source via the series-resonant circuit or extracted by the load. The energy balance setting is determined by the times at which the thyristors of the bridge circuit are triggered.

An energy converter as set forth in the opening paragraph is disclosed, for example, in the "IEEE Transactions on Industrial Electronics and Control Instrumentation", vol. IECI-23, No. 2, May 1976, pp. 142-150. The energy converter described in this article comprises a control circuit for delivering, in response to the current flowing in the series-resonant bridge circuit and to a voltage derived from the output voltage of the output transformer, trigger pulses to bring the appropriate thyristors into the conducting state. It may however occur that a thyristor of the bridge circuit remains in the conducting state for a longer time than intended, while a thyristor connected in series therewith should already have been brought into the conducting state. Should the latter occur, this means a short-circuit in the bridge circuit. To prevent such short-circuits, a rather long time would have to elapse before the latter thyristor (i.e. the off thyristor brought into the conducting state. As a consequence, a large ripple would arise on the output signal of the energy converter.

According to the European patent specification No. 0 071 285, such a disadvantage is solved with a full bridge circuit as the energy converter contains two antiparallel-connected thyristors in series with the bridge circuit. These thyristors prevent the situation that, during the resting period occurring when the energy converter operates in the trigger mode, no current is flowing in the bridge circuit. This ensures in the first instance that a capacitor in the series-resonant circuit, after the supply of energy to the load, is not further discharged. As a result of this, the diode connected antiparallel to the thyristor last conducting starts to draw current immediately after this thyristor is blocked.

The above solution has the disadvantage that two additional control circuits re required for driving and extinguishing the two antiparallel-connected thyristors. Besides, these two thyristors should be of the symmetric type because the voltage across the thyristors, with the switching of the bridge circuit, changes in polarity while the amplitude remains the same. Consequently, there is a relatively high voltage across the two antiparallel-connected thyristors if one of these is in the conducting state, causing the efficiency of the bridge circuit to be decreased. Moreover, through the loss in efficiency the bridge circuit, on account of the greater heat development, has to be accommodated in a larger space. Because of the current flowing in the series-resonant circuit during the so called resting period of this circuit, it may happen that the thyristors fail to extinguish at the correct moment. To prevent this, additional measures have to be taken, as described in the cited European patent specification No. 0 071 285.

SUMMARY OF THE INVENTION

The present invention has for its object to obviate the above disadvantages.

According to the invention the energy converter comprises a switching circuit for ensuring that the diode antiparallel connected to the last-conducting thyristor starts to draw current immediately after said thyristor is blocked, which switching circuit is incorporated in at least one of the supply lines of the supply source to the series-resonant circuit to prevent that during the resting period, occurring when the energy converter operates in the trigger mode, no current is flowing in the bridge circuit.

BRIEF DESCRIPTION OF THE DRAWINGS

The invention will now be explained in more detail with reference to the accompanying drawing in which:

FIGS. 2A, 2B, 3A, 3B, 4A and 4B are diagrams useful in explaining the operation of the energy converter in FIG. 1.

DESCRIPTION OF THE PREFERRED EMBODIMENTS

Figure 1:
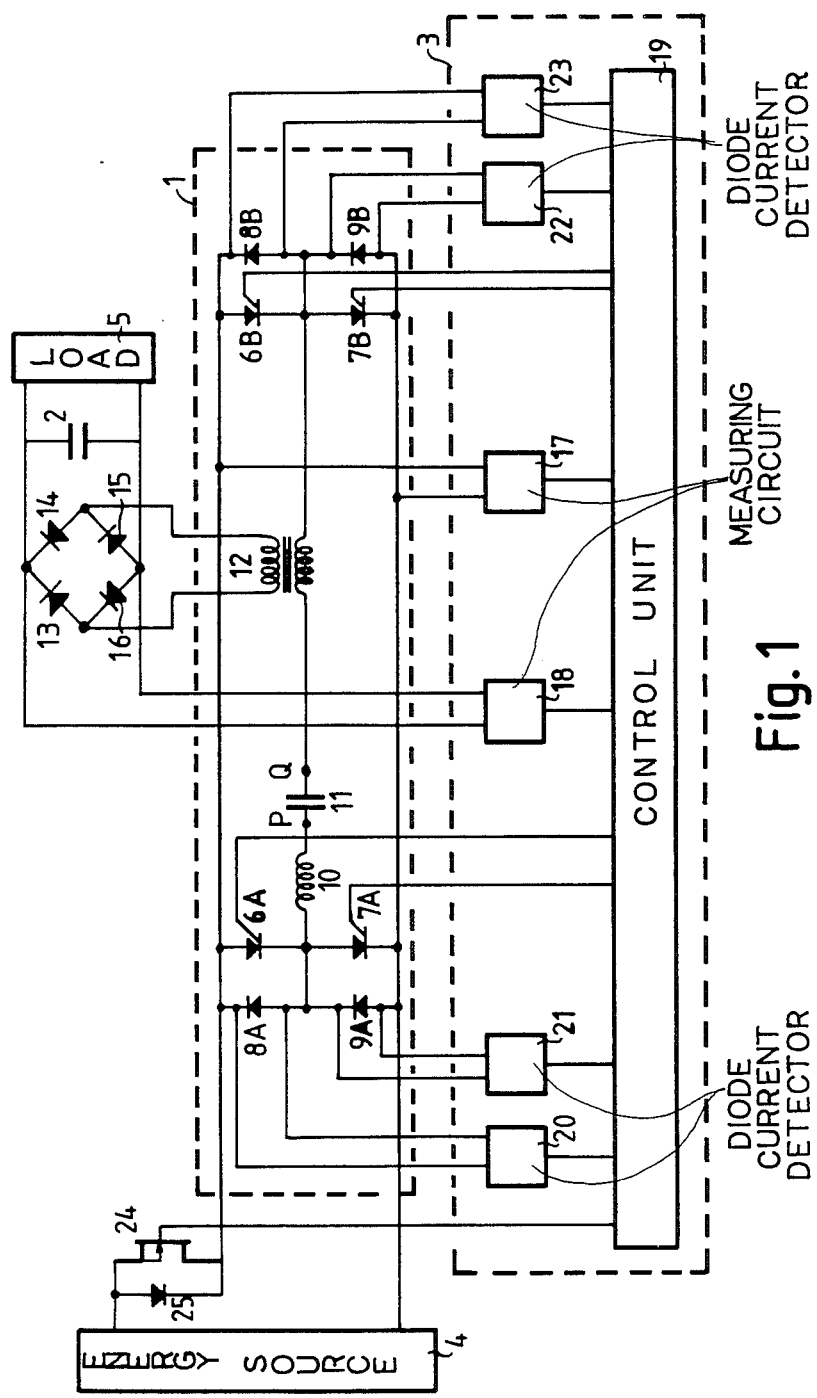
FIG. 1 is an embodiment of the energy converter according to the invention.

In the embodiment of FIG. 1 a "full" bridge circuit is used. The energy converter of FIG. 1 comprises a series-resonant bridge circuit 1, an energy buffer 2 and a control circuit 3. Energy from a source 4 is supplied to a load 5 via bridge circuit 1 and buffer 2. The series-resonant bridge circuit 1 includes four thyristors 6A, 6B, 7A and 7B (and hence a full bridge circuit), diodes 8A, 8B, 9A and 9B antiparallel connected to the four thyristors, a coil 10, a capacitor 11, a high-frequency output transformer 12, and four rectifier diodes 13-16. The operation of such a series-resonant bridge is known and described in "IEEE Transactions on Industrial Electronics and Control Instrumentation", vol. IECI-17, No. 3, May 1970, pp. 209-221, and vol. IECI-23, No. 2, May 1976, pp. 142-149 and in the U.S. Pat. No. 3,953,779.

FIGS. 2A and 2B show, respectively, the flow of the current $I_L$ through coil 10, and the voltage $E_C$ across points P and Q. In phase A (thyristor phase) the thyristors 6A and 7B are in the conducting state. Current $i_L$ increases in the first instance, causing the voltage $E_C$ to rise, whereupon the current $i_L$ decreases to zero again, and the voltage $E_C$ assumes its maximum value. As soon as current $i_L$ is zero, thyristors 6A and 7B cease to conduct and an opposite current starts to flow through diodes 8A and 9B. In the then commencing phase B (diode phase), this diode current causes the voltage $E_C$ to decrease slightly. When the diode current is finally zero, the voltage $E_C$ remains constant until thyristors 6B and 7A are brought into the conducting state. In thyristor phase C and the subsequent diode phase D the current $i_L$ is equal, but opposite to that flowing in phases A and B, respectively, while voltage $E_C$ is also equal, but opposite to that in phases A and B. FIGS. 3A and 3B show, respectively, the flow of the current $i_L$ through coil 10, and the voltage $E_C$ for the case where the thyristors are already in the conducting state; such a situation is termed the "indented mode". The situation depicted in FIGS. 2A and 2B is designated as the "trigger mode".

In phases A and C, energy from source 4 is supplied to energy buffer 2 and extracted from this buffer by load 5; in phases B and D, a portion of the energy supplied to buffer 2 is returned to the source via the series-resonant circuit and a portion is extracted by load 5. Depending on the energy supplied to the series-resonant circuit and the energy extracted from the buffer, it is possible to create an equilibrium, where the amount of energy at buffer 2 is kept constant by appropriately setting the firing instants of thyristors 6A, 7B and 6B, 7A, respectively. In this situation the magnitude of the voltage across the primary winding of output transformer 12 is in fact constant and the resonant frequency of the circuit is determined by the product LC, where L is the self-induction of coil 10 and C the capacitance of capacitor 11.

Figures 4A, 4B:
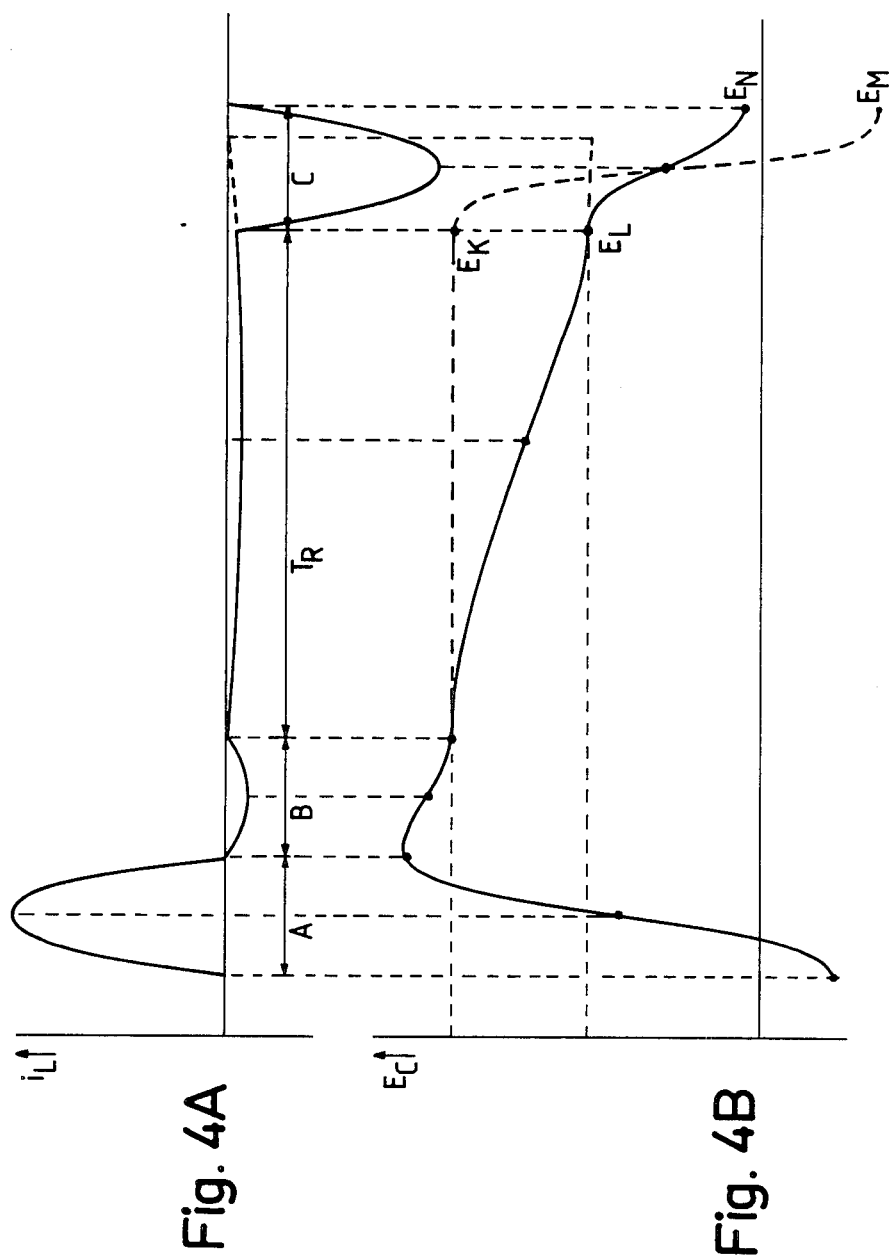

The setting of the energy balance is effected in control circuit 3. This circuit comprises a measuring circuit 17 for the input voltage of the series-resonant circuit, a measuring circuit 18 for the voltage across buffer 2, and a control unit 19 for generating the trigger pulses for thyristors 6A, 7B and 6B, 7A, respectively, at the appropriate times, depending on the output signals of the measuring circuits 17 and 18. To prevent short-circuiting in the series-resonant circuit, the trigger pulse for thyristors 6B and 7A may be supplied only if thyristors 6A and 7B are blocked and, conversely, the trigger pulse for thyristors 6B and 7A may be supplied only if thyristors 6A and 7B are blocked. Thyristors 6A, 7B and 6B, 7A are blocked when, respectively, diodes 8A, 9B and 8B, 9A are brought into the conducting state. To establish this state, control circuit 3 comprises another four diode current detectors 20, 21, 22 and 23 for supplying signals indicative of current flowing through, respectively, diodes 8A and 9A, 9B and 8B. Control unit 19 comprises switching means for passing the thyristor trigger pulses in response to the reception of the above signals. In the trigger mode there is in general a resting period between the instant at which one diode ceases to conduct and the instant at which the thyristor connected in antiparallel to the other diode is brought into the conducting state. In FIG. 2A the resting period between phases B and C and between phases D and A is indicated by $T_R$. During time $T_R$ the voltage $E_C$ will decay through the primary winding of output transformer 12, the coil 10 and, depending on the value of $E_C$, through one of the diodes 8A, 8B, 9A and 9B. With a self-induction $L_p$ of the primary winding of the output transformer of a much greater value than the self-induction L of coil 10, the resonant frequency of the series-resonant circuit is determined by the product $L_p C$. FIG. 4A shows the flow of current in the series-resonant circuit in phases A, B and C and during the resting period $T_R$. The current flowing during time $T_R$ causes the voltage $E_C$ at point P to decrease. FIG. 4B shows the decrease of this voltage from $E_K$ to $E_L$ at the start of phase C and the increase of this voltage from $E_M$ to $E_N$ at the end of phase C. Because of the voltage drop across points P and Q during the resting period $T_R$, the voltage $E_C$ after phase C is able to assume such a value that the diode connected in antiparallel to the thyristor conducting in phase C remains blocked. That is, after one of the thyristors has ceased to conduct, it may occur that the diode connected in antiparallel thereto fails to conduct and, hence, blocks the supply of the trigger pulse for the next thyristor. Consequently, the output voltage drops below the set value, causing a large ripple on the output voltage.

To prevent this effect, the energy converter comprises a switching circuit for ensuring that the diode connected in antiparallel to the thyristor last conducting starts drawing current immediately after this thyristor is blocked. In the embodiment of FIG. 1, such switching circuit consists of the FET 24, triggered with the start of the phases B and C, the so-called diode phases, and an antiparallel-connected diode 25. This diode is not strictly necessary because a (MOS)-FET comprises by nature a diode. The insertion of a diode 25 has however the advantage that with a short-circuit in the bridge circuit, the FET 24 will not be damaged. The FET 24 extinguishes at the end of phases B and D. The FET 24 prevents any current flow in the bridge circuit during the resting period $T_R$, so that, at the end of phases A and C, the voltage $E_C$ is equal to $E_M$, see FIG. 4B. As a result, the diodes connected in antiparallel to the last-conducting thyristors start to draw current immediately after these thyristors are blocked. Conversely, no trigger pulses are needed in phases A and C, as in these phases the diode 25 or the diode present by nature in FET 24 starts conducting automatically. Consequently, the control unit 19 permits of a simpler and more compact design and this entails a saving in costs.

With respect to the insertion of two antiparallel-connected thyristors in the bridge circuit, there is also the advantage that only the diode 25 in antiparallel connection with the FET 24 conducts in phases A and C, as the voltage drop across a conducting diode is about 1 volt, whereas that across the antiparallel-connected thyristors is about 3 volts. This results in a considerable improvement in the efficiency in phases A and C. The smaller power losses also result in a saving of space, weight and costs. If during phases B and D the FET 24 starts conducting, the power loss with the application of this FET is about a factor of three smaller than the power loss which would be incurred in the event one of the two antiparallel connected thyristors were to start conducting. This implies that a further improvement in efficiency is obtained in phases B and D. Besides, in contradistinction to the case of two antiparallel-connected thyristors, no extinction circuit is necessary, thus resulting in another saving in costs. Finally, it should be noted that the switching circuit can utilize a transistor incorporating a diode antiparallel-connected thereto or a thyristor incorporating a diode antiparallel-connected thereto.

I claim:

1. An energy converter for supplying electric energy to a load from a source of electric energy comprising: a series-resonant bridge circuit coupled to the energy source via supply lines, said bridge circuit including at least two thyristors with diodes antiparallel connected thereto and a high-frequency output transformer, an energy buffer coupled to said output transformer and to the load, a control circuit coupled to the bridge circuit and the energy buffer for generating trigger pulses in response to energy supplied to and extracted from the buffer thereby to bring the appropriate thyristors into the conducting state, said control circuit including diode current detectors for supplying signals indicative of the presence of current flowing through said diodes and switching means for passing the trigger pulses to the thyristors in the bridge circuit, conditional upon the presence of current flowing through the respective diodes antiparallel connected to the thyristors conducting last and directly before said diodes, and a switching circuit for ensuring that the diode antiparallel-connected to the last-conducting thyristor starts to draw current immediately after said thyristor is blocked, said switching circuit being connected in at least one of the supply lines to ensure that, during a resting period occurring when the energy converter operates in a trigger mode, a current flows in the bridge circuit.

2. An energy converter as claimed in claim 1, wherein the switching circuit comprises of a FET and a diode antiparallel connected thereto, which diode is connected in one of said supply lines.

3. An energy converter as claimed in claim 1, wherein the switching circuit comprises of a MOSFET connected in one of said supply lines.

4. An energy converter as claimed in claim 1, wherein the switching circuit comprises of a transistor and a diode antiparallel connected thereto, which diode is connected in one of said supply lines.

5. An energy converter as claimed in claim 1, wherein the switching circuit consists of a thyristor and a diode antiparallel connected thereto, which diode is connected in one of said supply lines.

6. An energy converter as claimed in claim 1 wherein the switching circuit comprises a controlled semiconductor device having a control electrode coupled to an output of the control circuit to receive trigger signals at the start of each diode current conduction phase thereby to insure that the diode connected in anti-parallel to the thyristor last conducting starts drawing current immediately after said thyristor is blocked.

7. An energy converter as claimed in claim 1 wherein the switching circuit comprises a controlled semiconductor device having a control electrode coupled to an output of the control circuit to receive trigger signals at the start of each diode current conduction phase, said semiconductor device turning off at the end of the diode current conduction phase thereby to block current flow in the bridge circuit during said resting period.

8. An energy converter as claimed in claim 1 wherein the bridge circuit comprises four thyristors connected in a bridge circuit each with a respective anti-parallel connected diode, means connecting an inductor, a capacitor and a primary winding of the output transformer in series circuit between output terminals of the thyristor bridge circuit, and a rectifier circuit coupling an output winding of the output transformer to said energy buffer.

9. An energy converter as claimed in claim 1 wherein the energy buffer comprises a capacitor.

* * * * *